United States Patent [19]

Zimmerman

[11] Patent Number: 4,463,050
[45] Date of Patent: Jul. 31, 1984

[54] POLYURETHANE CATALYST SYSTEM ADDITIVE WHICH PERMITS THE USE OF RELATIVELY "COLD" MOLDS

[75] Inventor: Robert L. Zimmerman, Austin, Tex.

[73] Assignee: Texaco Inc., White Plains, N.Y.

[21] Appl. No.: 429,588

[22] Filed: Sep. 30, 1982

[51] Int. Cl.$^3$ ............................................. B29D 27/00
[52] U.S. Cl. ................................ 428/318.8; 264/45.5; 264/331.19; 428/423.3; 521/126; 521/127; 521/129; 521/904
[58] Field of Search .................... 264/45.5, 331.19; 521/51, 90, 94, 126, 127, 129, 904; 428/318.8, 423.3

[56] References Cited

U.S. PATENT DOCUMENTS

| | | |
|---|---|---|
| 2,683,730 | 7/1954 | Seeger et al. . |
| 2,950,263 | 8/1960 | Abbotson et al. . |
| 3,012,008 | 12/1961 | Lister . |
| 3,072,582 | 1/1963 | Frost ................................ 521/164 X |
| 3,087,928 | 4/1963 | Godfrey . |
| 3,127,436 | 3/1964 | Flynn . |
| 3,194,773 | 7/1965 | Hostettler . |
| 3,243,387 | 3/1966 | Blume et al. . |
| 3,344,162 | 9/1967 | Rowton . |
| 3,362,979 | 1/1968 | Bentley . |
| 3,786,005 | 1/1974 | Bechara et al. . |
| 3,912,689 | 10/1975 | Bechara et al. ....................... 528/53 |
| 3,925,268 | 12/1975 | Rosemund et al. . |
| 3,925,368 | 12/1975 | Cooper et al. . |
| 3,981,829 | 9/1976 | Cenker et al. . |
| 4,011,223 | 3/1977 | Priest et al. ........................ 564/197 |
| 4,012,445 | 3/1977 | Priest et al. . |
| 4,022,720 | 5/1977 | Blahak et al. . |
| 4,026,840 | 5/1977 | Bechara et al. . |
| 4,033,911 | 7/1977 | Sandner et al. . |
| 4,038,210 | 7/1977 | Rosemund et al. ................. 252/426 |
| 4,048,107 | 9/1977 | Babiec, Jr. et al. . |
| 4,251,637 | 2/1981 | McEntire et al. ................... 521/115 |
| 4,326,042 | 4/1982 | Zimmerman ........................ 521/115 |

Primary Examiner—Philip E. Anderson
Attorney, Agent, or Firm—Jack H. Park; Kenneth R. Priem; David L. Mossman

[57] ABSTRACT

A method for making polyurethanes in a mold that is cooler than usual; i.e., at a temperature less than 120° F., is described. Normally, polyurethanes made in relatively "cold" molds contain numerous surface voids. However, N-alkylmorpholines have been discovered to be effective "cold sink" catalyst additives which permit void-free polyurethane formation even in cooler than average molds. The additive should comprise from about 10 to about 30 wt. % of the entire catalyst portion of the polyurethane formulation.

7 Claims, No Drawings

POLYURETHANE CATALYST SYSTEM ADDITIVE WHICH PERMITS THE USE OF RELATIVELY "COLD" MOLDS

BACKGROUND OF THE INVENTION

1. Field of the Invention

The invention pertains to the field of polyurethane manufacture and more particularly relates to producing polyurethanes in relatively cold molds using a catalyst additive.

2. Description of Other Relevant Methods in the Field

Polyurethanes are typically prepared by the reaction of a polyisocyanate and a polyol in the presence of a catalyst. The catalyst is employed to promote at least two, and sometimes three, major reactions that must proceed simultaneously and competitively at balanced rates during the process in order to provide polyurethanes with the desired physical characteristics. One reaction is a chain extending isocyanate-hydroxyl reaction by which a hydroxyl-containing molecule is reacted with an isocyanate-containing molecule to form a urethane. This increases the viscosity of the mixture and provides a polyurethane containing a secondary nitrogen atom in the urethane groups. A second reaction is a crosslinking isocyanate urethane reaction by which an isocyanate-containing molecule reacts with a urethane group containing a secondary nitrogen atom. The third reaction which may be involved is an isocyanate-water reaction by which an isocyanate-terminated molecule is extended and by which carbon dioxide is generated to blow or assist in the blowing of the foam. The third reaction is not essential if an extraneous blowing agent, such as a halogenated, normally liquid hydrocarbon, carbon dioxide, etc. is employed, but is essential if all or even a part of the gas for foam generation is to be generated by this in situ reaction (e.g. in the preparation of "one-shot" flexible polyurethane foams).

The reactions must proceed simultaneously at optimum balanced rates relative to each other in order to obtain a good foam structure. If carbon dioxide evolution is too rapid in comparison with chain extension, the foam will collapse. If the chain extension is too rapid in comparison with carbon dioxide evolution, foam rise will be restricted, resulting in a high density foam with a high percentage of poorly defined cells. The foam will not be stable in the absence of adequate crosslinking.

It has long been known that tertiary amines, such as trimethylamine, triethylamine, etc., are effective for catalyzing the second crosslinking reaction. Other typical tertiary amines are set forth in U.S. Pat. Nos. 3,925,368; 3,127,436 and 3,243,387 and German OLS Nos. 2,354,952 and 2,259,980. Some of the tertiary amines are effective for catalyzing the third water-isocyanate reaction for carbon dioxide evolution. However, tertiary amines are only partially effective as catalysts for the first chain extension reaction. To overcome this problem, the so-called "prepolymer" technique has been developed wherein a hydroxy-containing polyol component is partially reacted with the isocyanate component in order to obtain a liquid prepolymer containing free isocyanate groups. This prepolymer is then reacted with additional polyol in the presence of a tertiary amine to provide a foam. This method is still commonly employed in preparing rigid urethane foams, but has proven less satisfactory for the production of flexible urethane foams.

For flexible foams, a one-step or "one-shot" process has been developed wherein a tertiary amine, such as triethylenediamine, is employed in conjunction with an organic tin compound. Triethylenediamine is particularly active for promoting the water-isocyanate reaction and the tin compound is particularly active in synergistic combination with the triethylenediamine for promoting the chain extension reaction. However, even here, the results obtained leave much to be desired. Triethylenediamine is a solid and must be dissolved prior to use to avoid processing difficulties. Also, triethylenediamine and other of the prior art amines can impart a strong amine odor to the polyurethane foam.

In addition to problems of odor and handling due to solid character, other tertiary amines suffer still further deficiencies. For example, in some instances the compounds are relatively high in volatility leading to obvious safety problems. In addition, some catalysts of this type do not provide sufficient delay in foaming, which delay is particularly desirable in molding applications to allow sufficient time to situate the preform mix in the mold. Yet other catalysts, while meeting specifications in this area do not yield foams with a desirable tack-free time.

While certain tertiary amines are somewhat suitable in this catalytic area they nevertheless do not have a sufficiently high tertiary amine content in terms of the number of tertiary amines compared to overall molecular weight. It is believed that the higher the tertiary amine content the more rapid the catalytic activity in the polyurethane art.

Heterocyclic tertiary amines are known as urethane catalysts, the most well known being perhaps N-ethylmorpholine. Unfortunately, this particular catalyst also has a high amine odor which is transferred to resultant urethane foam, which is undesirable. U.S. Pat. No. 3,087,928 contains a brief suggestion that N-alkylmorpholines are useful as catalysts in the production of polyurethane foams. A number of heterocyclic tertiary amines have recently been found to be catalytically active for polyurethane and polyisocyanurate production. For example, U.S. Pat. No. 4,251,637 shows that tertiary amino substituted oxazolidines are useful as polyisocyanurate catalysts. These materials may be prepared by reacting a tertiary-primary diamine with a glycol and then using a formaldehyde treatment. Beta-aminopropionitriles containing both oxygen and nitrogen in their rings have found utility as urethane catalysts according to U.S. Pat. No. 3,925,268. Utility as a polyurethane catalyst is also found for bis-(1,4-beta-amino carbonyl-ethyl)-piperazines according to U.S. Pat. Nos. 4,011,223 and 4,012,445 and for 4-(2-dimethylaminoethyl)morpholine described in U.S. Pat. No. 3,786,005. Dialkylaminoalkylimidazoles are other heterocyclic tertiary amines useful as urethane catalysts as disclosed in U.S. Pat. No. 3,912,689. The compound alkanolaminotriazines and hexahydrotriazines catalyze the creation of carbodiimide and isocyanurate linkages as revealed in U.S. Pat. No. 3,981,829. Other tertiary amines recently found to be useful catalysts which do not contain cyclic portions are described in U.S. Pat. Nos. 4,022,720; 4,026,840; 4,033,911; 4,038,210 and 4,048,107.

Blends of catalysts have also been found to be useful. For example, U.S. Pat. No. 4,326,042 teaches that N-methoxypropylmorpholine, N-butylmorpholine and N,N'-dimethylpiperazine together form a catalyst system which gives a homogeneous activator solution that can provide finer, more uniform cells to polyester-based polyurethane foams than could be had by each catalyst used alone. A similar catalyst system is described in patent application Ser. No. 328,291 filed on Dec. 7, 1981 now U.S. Pat. No. 4,376,832.

One problem with making molded high resilience flexible foams occurs if the mold is too cold. Normally, the mold is at a temperature between 120° and 155° F. If the mold temperature is lower than 120° F., voids or holes start to appear on the surface of the foam. It would be desirable to devise a formulation, catalyst or method which would produce a good foam without voids when the mold temperature drops below 120° F.

SUMMARY OF THE INVENTION

The invention concerns a method for producing a polyurethane without surface voids within a "cold" mold which comprises reacting an organic polyisocyanate with an organic polyether polyol in the presence of a catalytic amount of an amine catalyst system of which 10 to 30 wt.% is an N-alkylmorpholine where the alkyl substituent has from one to four carbon atoms. The reaction takes place within a mold having an average temperature of less than 120° F.

DETAILED DESCRIPTION OF THE PREFERRED EMBODIMENTS

The "cold sink" polyurethane catalyst additive of this invention may have the formula:

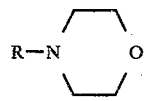

where R is a lower alkyl of one to four carbon atoms. The lower alkyl substituent may be straight or branched, but should not contain any heteroatoms, such as oxygen or nitrogen nor any heterocyclic rings, such as another morpholine ring. As will be demonstrated, N-alkylmorpholines falling outside the above definition do not have the same void-inhibiting effect on "cold sink" foams as do the materials that meet the definition. It was surprising to discover that the class of effective N-alkylmorpholines was so limited. Representative of effective N-alkylmorpholine additives are N-methylmorpholine, N-ethylmorpholine, N-propylmorpholine and N-butylmorpholine.

The N-alkylmorpholine "cold sink" catalyst additives found to be effective in the method of this invention may be synthesized by the direct alkylation of a morpholine with a non-tertiary alkanol in the presence of hydrogen and a catalyst. The catalyst is a combination of nickel or cobalt, copper, chromium oxide, titanium oxide, thorium oxide, magnesium oxide, zinc oxide, manganese oxide or a rare earth oxide. This synthesis is described in more detail in U.S. Pat. No. 3,087,928, incorporated by reference herein. Other syntheses would also be useful.

To be effective in preventing surface voids when a polyurethane is formed within a mold having a temperature less than 120° F., the additive should form between about 10 and about 30 wt.% of the total catalyst portion used. An additive portion of 8 wt.% was found to be borderline in void-prevention effectiveness, while a proportion of 14 wt.% worked well. In turn, the total catalyst portion should be employed in an amount of from about 0.05 to about 1.0 wt.%, based on the combined weight of the polyol and polyisocyanate components. The method of this invention is expected to work over the mold temperature range of 105° to 155° F. While the catalyst system of this invention has been tested only with highly resilient flexible foams, it would not be unexpected to find that it is effective in other types of molded polyurethane foams.

The catalyst additive of this invention should be used in a mixture with one or more other catalysts such as tertiary amines or with an organic tin compound or other polyurethane catalysts. The organic tin compound, particularly useful in making molded flexible foams, may suitably be a stannous or stannic compound such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixtue thereof, may be used.

Such tertiary amines include trialkylamines (e.g., trimethylamine, triethylamine), heterocyclic amines such as N-alkylmorpholine (e.g., N-methylmorpholine, N-ethylmorpholine, etc.), 1,4-dimethylpiperazine, triethylenediamine, etc., and aliphatic polyamines such as N,N,N'N'-tetramethyl-1,3-butanediamine. It is preferred that the other catalysts in the method of this invention be tertiary amine catalysts.

As noted in the previous paragraph and in the section which discussed other related methods in the field, N-alkylmorpholines are well known as polyurethane catalysts. However, N-alkylmorpholines have never been identified as "cold sink" catalysts which may be used in small quantities (10–30 wt.%) to produce excellent foams when the mold temperature drops below 120° F.

To prepare polyurethanes using the catalysts described above, any aromatic polyisocyanate may be used. Typical aromatic polyisocyanates include m-phenylene diisocyanate, p-phenylene diisocyanate, polymethylene polyphenylisocyanate, 1,4-toluene diisocyanate, 2,6-toluene diisocyanate, dianisidine diisocyanate, bitolylene diisocyanate, naphthalene-1,4-diisocyanate, xylylene-1,4-diisocyanate, xylylene-1,3-diisocyanate, bis(4-isocyanatophenyl)methane, bis(3-methyl-4-isocyanatophenol)methane, bis(3-methyl-4-isocyanatophenyl)methane and 4,4'-diphenylpropane diisocyanate.

Greatly preferred aromatic polyisocyanates used in the practice of the invention are 2,4- and 2,6-toluene diisocyanates and methylene-bridged polyphenyl polyisocyanate mixtures which have a functionality of from about 2 to 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents; for example, U.S. Pat. Nos. 2,683,730; 2,950,263; 3,012,008; 3,344,162 and 3,362,979.

Most preferred methylene-bridged polyphenyl polyisocyanate mixtures used here contain about 20 to about 100 wt.% methylene diphenyldiisocyanate isomers, of which 20 to about 95 wt.% thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

The hydroxyl-containing polyol component which reacts with the isocyanate may suitably be a polyester polyol or a polyether polyol having a hydroxyl number ranging from about 700 to about 25, or lower. When it is desired to provide a flexible foam, the hydroxyl number is preferably in the range from about 25 to 60. For rigid foams, the hydroxyl number is preferably in the range from 350 to 700. Semi-rigid foams of a desired flexibility are provided when the hydroxyl number is intermediate to the ranges just given.

Also, for a flexible urethane foam the polyol should preferably have an average functionality of from about 2 to about 4 and a molecular weight of from about 2,000 to about 6,000. For rigid foams, the functionality of the polyol component is preferably from about 4 to about 8.

When the polyol is a polyester, it is preferable to use as the polyester a resin having a relatively high hydroxyl value and a relatively low acid value made from the reaction of a polycarboxylic acid with a polyhydric alcohol. The acid component of the polyester is preferably of the dibasic or polybasic type and is usually free of reactive unsaturation, such as ethylenic groups or acetylenic groups. The unsaturation, such as occurs in the rings of such aromatic acids as phthalic acid, terephthalic acid, isophthalic acid, or the like, is non-ethylenic and non-reactive. Thus, aromatic acids may be employed for the acid component. Aliphatic acids, such as succinic acid, adipic acid, sebacic acid, azelaic acid, etc. may also be employed and are preferred. The alcohol component for the polyester should preferably contain a plurality of hydroxyl groups and is preferably an aliphatic alcohol, such as ethylene glycol, glycerol, pentaerthritol, trimethylolethane, trimethylolpropane, mannitol, sorbitol or methyl glucoside. Mixtures of two or more of the above identified alcohols may be employed also if desired.

When the hydroxyl-containing component is a polyether polyol for use in flexible polyurethane foam, the polyol may be an alkylene oxide adduct of a polyhydric alcohol with a functionality of from about 2 to about 4. The alkylene oxide may suitably be ethylene oxide, propylene oxide or 1,2-butylene oxide, or a mixture of some or all of these. The polyol will suitably have a molecular weight within the range of from about 2,000 to about 7,000. For flexible polyether polyurethane foams, the alkylene oxide is preferably propylene oxide or a mixture of propylene oxide and ethylene oxide.

The amount of hydroxyl-containing polyol compound to be used relative to the isocyanate compound in both polyester and polyether foams normally should be such that the isocyanate grops are present in at least an equivalent amount, and preferably, in slight excess, compared with the free hydroxyl groups. Preferably, the ingredients will be proportioned so as to provide from about 0.9 to about 1.5 mole equivalents of isocyanate groups per mole equivalent of hydroxyl groups. However, for certain shock absorbing foams we have found that by using the catalyst of our invention the mole equivalents of isocyanate to hydroxyl groups can be as low as 0.4.

When water is used, the amount of water, based on the hydroxyl compound, is suitably within the range of about 0.05 mole to about 10.0 moles per mole equivalent of hydroxy compound.

It is within the scope of the present invention to utilize an extraneously added inert blowing agent such as a gas or gas-producing material. For example, halogenated low-boiling hydrocarbons, such as trichloromonofluoromethane and methylene chloride, carbon dioxide, nitrogen, etc. may be used. The inert blowing agent reduces the amount of excess isocyanate and water that is required in preparing flexible urethane foam. For a rigid foam, the use of water is often avoided and the extraneous blowing agent is used exclusively. Selection of the proper blowing agent is well within the knowledge of those skilled in the art. See, for example, U.S. Pat. No. 3,072,582.

Conventional formulation ingredients are also employed such as, for example, foam stabilizers, also known as silicone oils or emulsifiers. The foam stabilizer may be an organic silane or siloxane. For example, compounds may be used having the formula:

$$RSi[O-(R_2SiO)_n-(oxyalkylene)_mR]_3$$

where R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

In preparing a flexible foam, the ingredients may be simultaneously, intimately mixed with each other by the so-called "one-shot" method to provide a foam by a one-step process. In this instance, water should comprise at least a part (e.g. 10% to 100%) of the blowing agent. The foregoing methods are known to those skilled in the art, as evidenced by the following publication: duPont Foam Bulletin, "Evaluation of Some Polyols in One-Shot Resilient Foams", Mar. 22, 1960.

The invention will be illustrated further with respect to the following specific examples, which are given by way of illustration and not as limitations on the scope of this invention.

EXAMPLES A-F

The following foams were prepared using a 10"×10"×4" closed aluminum mold. Quantities of all components are given in terms of parts by weight.

|  | A | B | C | D | E | F |
|---|---|---|---|---|---|---|
| THANOL ® SF-5505[1] | 60 | 60 | 60 | 60 | 60 | 60 |
| NIAX ® 34-28[2] | 40 | 40 | 40 | 40 | 40 | 40 |
| Water | 3.5 | 3.5 | 3.5 | 3.5 | 3.5 | 3.5 |
| Silicone B-8610[3] | 1.8 | 1.8 | 1.8 | 1.8 | 1.8 | 1.8 |
| Diethanolamine | 1.2 | 1.2 | 1.2 | 1.2 | 1.53 | 1.53 |
| FOMREZ ® UL-1[4] | 0.007 | 0.007 | 0.007 | 0.007 | 0.007 | 0.007 |
| Trichlorofluoromethane | 6.0 | 6.0 | 6.0 | 6.0 | 6.0 | 6.0 |
| THANCAT ® TD-35[5] | 0.55 | 0.55 | 0.55 | 0.55 | 0.55 | 0.55 |
| NIAX A-1[6] | 0.14 | 0.14 | 0.14 | 0.14 | — | — |
| N—butylmorpholine | — | 0.24 | — | — | — | 0.24 |
| N—ethylmorpholine | — | — | 0.18 | — | — | — |
| B,B'-dimorpholinodiethyl ether | — | — | — | 0.18 | — | — |
| THANCAT DD[7] | — | — | — | — | 0.24 | 0.24 |

-continued

|  | A | B | C | D | E | F |
|---|---|---|---|---|---|---|
| Toluene diisocyanate | 43.1 | 43.1 | 43.1 | 43.1 | 43.8 | 43.8 |
| NCO/OH index | 1.03 | 1.03 | 1.03 | 1.03 | 1.03 | 1.03 |
| Mold temp., °F. | 112 | 112 | 112 | 112 | 112 | 112 |
| Foam appearance | void present | good foam no void | good foam no void | void present | void present | good foam |

[1] A highly reactive, capped 5500 molecular weight polyol sold by Texaco Chemical Co.
[2] A polymer polyol hydroxyl number 28 sold by Union Carbide Corp.
[3] A silicone surfactant sold by Goldschmidt
[4] A tin catalyst sold by Witco Chemical Co.
[5] 33% triethylenediamine in propylene glycol sold by Texaco Chemical Co.
[6] 70% bis(dimethylaminoethyl)ether in dipropylene glycol sold by Union Carbide Corp.
[7] 2-Dimethylaminoethyl-3-dimethylaminopropyl ether sold by Texaco Chemical Co.

It may be seen that foam A, in which a conventional catalyst system was used, had voids present. Foams B and C had an alkylmorpholine added to the catalyst system and these modified formulations produced foams without voids. Foam D shows that not all alkyl substituted morpholine compounds work as "cold sink" catalysts which give foams without voids. In addition to the β,β'-dimorpholinodiethyl ether additive which was found to be ineffective, N-methoxyethylmorpholine was also found to give voids at this temperature. Thus, morpholine additives with alkyl substituents having oxygen atoms appear to be ineffective.

Foams E and F illustrate a second highly resilient flexible foam formulation where again the addition of N-butylmorpholine (foam E) cures the voiding problem (foam F).

While foaming operations usually use a mold at a temperature between 120° and 155° F., when a system starts up after being idle during a cold night, the mold temperature is frequently below 120° F. This invention provides a satisfactory solution to this problem.

Many modifications may be made in the method of this invention without departing from the spirit and scope thereof which is defined only by the appended claims. For example, the foam formulation may be modified or the catalyst system changed slightly to optimize the foam properties or to provide a system that will perform well at even lower temperatures.

I claim:

1. A method for producing a polyurethane without voids within a "cold" mold which comprises reacting an organic polyisocyanate with an organic polyether polyol in the presence of a catalytic amount of an amine catalyst system of which about 10 to about 30 wt.% is an N-alkylmorpholine where the alkyl substituent has from one to four carbon atoms, within a mold having an average temperature of equal to or greater than 105° F. and less than 120° F.

2. The method of claim 1 in which the N-alkylmorpholine is selected from the group consisting of N-ethylmorpholine and N-butylmorpholine.

3. The method of claim 1 in which the polyurethane is a cellular polyurethane obtained by reacting said polyol with said isocyanate in the presence of a blowing agent.

4. The method of claim 1 in which a highly resilient flexible polyurethane foam is produced.

5. A voidless polyurethane foam made by reacting an organic polyisocyanate with an organic polyether polyol in the presence of a catalytic amount of an amine catalyst which contains an N-alkylmorpholine additive, in which the alkyl substituent had from one to four carbon atoms and which was about 10 to 30 wt.% of the total catalyst portion, within a mold having an average temperature of equal to or greater than 105° F. and less than 120° F.

6. The polyurethane foam of claim 5 in which the N-alkylmorpholine additive is taken from the group consisting of N-ethylmorpholine and N-butylmorpholine.

7. The use of N-alkylmorpholines of the formula

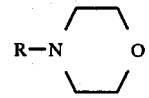

where R is a lower alkyl of one to four carbon atoms, as an additive of proportions of about 10 to 30 wt.% of the total catalyst portion in polyurethane foam formulations which would permit the foam to be cast in a mold having a temperature of equal to or greater than 105° F. and below 120° F. without the occurrence of surface voids.

* * * * *